United States Patent [19]

Nehmer et al.

[11] Patent Number: 4,850,250
[45] Date of Patent: Jul. 25, 1989

[54] BRAKE-INITIATED RELEASE OF AN ELECTRIC MOTOR DRIVEN CRUISE CONTROL SYSTEM

[75] Inventors: Carl A. Nehmer, Grand Blanc; Steven W. Aikman, Davison, both of Mich.

[73] Assignee: General Motors Corporation, Detroit, Mich.

[21] Appl. No.: 129,446

[22] Filed: Dec. 7, 1987

[51] Int. Cl.⁴ .............................................. B60K 41/20
[52] U.S. Cl. ..................................... 74/857; 192/1.46; 180/179
[58] Field of Search ................. 74/866, 857; 192/1.46, 192/1.43, 1.45, 1.2; 180/177, 179

[56] References Cited

U.S. PATENT DOCUMENTS

| | | | |
|---|---|---|---|
| 2,537,444 | 1/1951 | Click | 192/1.43 |
| 3,073,422 | 1/1963 | Baumann | 192/3.5 X |
| 3,315,134 | 4/1967 | Scholl | 361/153 |
| 3,338,357 | 8/1967 | Hollins | 192/1.45 |
| 3,542,148 | 11/1970 | Wilson | 180/179 X |
| 3,581,156 | 5/1971 | Dolbachian | 317/123 |
| 4,034,627 | 7/1977 | Mizote | 74/866 |
| 4,073,204 | 2/1978 | Dick | 74/866 |
| 4,158,398 | 6/1979 | Riddel | 180/177 |
| 4,167,030 | 9/1979 | Heidt | 361/154 |
| 4,228,700 | 10/1980 | Espenschied et al. | 74/866 |
| 4,234,903 | 11/1980 | Harper | 361/154 |
| 4,352,402 | 10/1982 | Cullonia | 180/179 X |
| 4,473,862 | 9/1984 | Hill | 361/155 |
| 4,643,038 | 2/1987 | Bryam | 74/397 |
| 4,653,351 | 3/1987 | Downs et al. | 74/866 |
| 4,684,866 | 8/1987 | Nehmer et al. | 318/696 |

FOREIGN PATENT DOCUMENTS

7421740  12/1977  France ............................... 180/179

Primary Examiner—Leslie A. Braun
Assistant Examiner—Christopher C. Campbell
Attorney, Agent, or Firm—Mark A. Navarre

[57] ABSTRACT

In a motor driven automotive cruise control system, the engine throttle is progressively released upon actuation of the vehicle service brakes to avoid objectionable pedal slap noise. The release is initiated by the electric motor, which drives the engine throttle toward its closed (rest) position while maintaining engagement of a clutch connected therebetween. If the duration of the brake actuation exceeds a reference interval sufficiently long as to indicate potentially significant braking effort, the clutch is immediately disengaged to return the throttle to its closed position without further delay. If the duration of the brake actuation is less than the reference interval, engagement of the clutch is maintained until the motor has returned the throttle to its closed position.

4 Claims, 9 Drawing Sheets

BRAKE-INITIATED RELEASE OF AN ELECTRIC MOTOR DRIVEN CRUISE CONTROL SYSTEM

This invention relates to electric motor driven cruise control systems for motor vehicles, and more particularly to a control for disengaging the cruise control upon actuation of the vehicle brakes.

BACKGROUND OF THE INVENTION

In the motor vehicle vernacular, the term cruise control is used in referring to a system which controls the powertrain of the vehicle to maintain a selected vehicle cruising speed. The present invention is directed to a cruise control system which achieves such control by adjusting the throttle position of an internal combustion engine with an electric motor. In normal operation, the electric motor is inactive and the driver of the vehicle controls the position of the throttle by manipulating an accelerator pedal mechanically coupled thereto. In cruise operation, the driver releases the accelerator pedal, and the electric motor is activated to suitably adjust the throttle position for maintaining the selected vehicle speed.

A hallmark of any cruise control system is that the throttle control is automatically released upon driver actuation of the vehicle service brakes. Such a release is referred to herein as a brake-initiated release. In electric motor driven systems, the release may be achieved by de-clutching the electric motor from the throttle. While this achieves a quick release of the cruise control, the accompanying movement of the accelerator pedal can produce an annoying noise, referred to herein as pedal slap.

SUMMARY OF THE PRESENT INVENTION

The present invention is directed to an improved electric motor driven cruise control system having a clutch connected between the motor and the engine throttle and a progressive brake-initiated release of the throttle control which avoids the production of objectionable pedal slap noise.

According to this invention, release of the throttle control upon actuation of the service brakes is initiated by using the electric motor to drive the engine throttle toward its closed (rest) position while maintaining engagement of the clutch. If the duration of the brake actuation exceeds a reference interval sufficiently long as to indicate potentially significant braking effort, the clutch is immediately disengaged to return the throttle to its closed position without further delay. If the duration of the brake actuation is less than the reference interval, engagement of the clutch is maintained until the motor has returned the throttle to its rest position.

The progressive release provided by this invention thereby eliminates the production of pedal slap noise in response to brief actuation of the service brakes. When the braking is prolonged, and therefore potentially significant, the pedal slap noise is at least lessened due to the initial progressive release during the reference interval.

BRIEF DESCRIPTION OF THE DRAWINGS

FIGS. 6 and 7 graphically depict brake-initiated releases according to this invention.

DETAILED DESCRIPTION OF THE DRAWINGS

FIGS. 1-5 depict an electric motor driven cruise control system incorporating the brake-initiated throttle release of this invention. A detailed description of such system, including the flow diagrams of FIGS. 8-14, is set forth in the Nehmer et al. U.S. Pat. No. 4,684,866, issued Aug. 4, 1987, assigned to the assignee of the present invention, and incorporated herein by reference.

Figure 1:
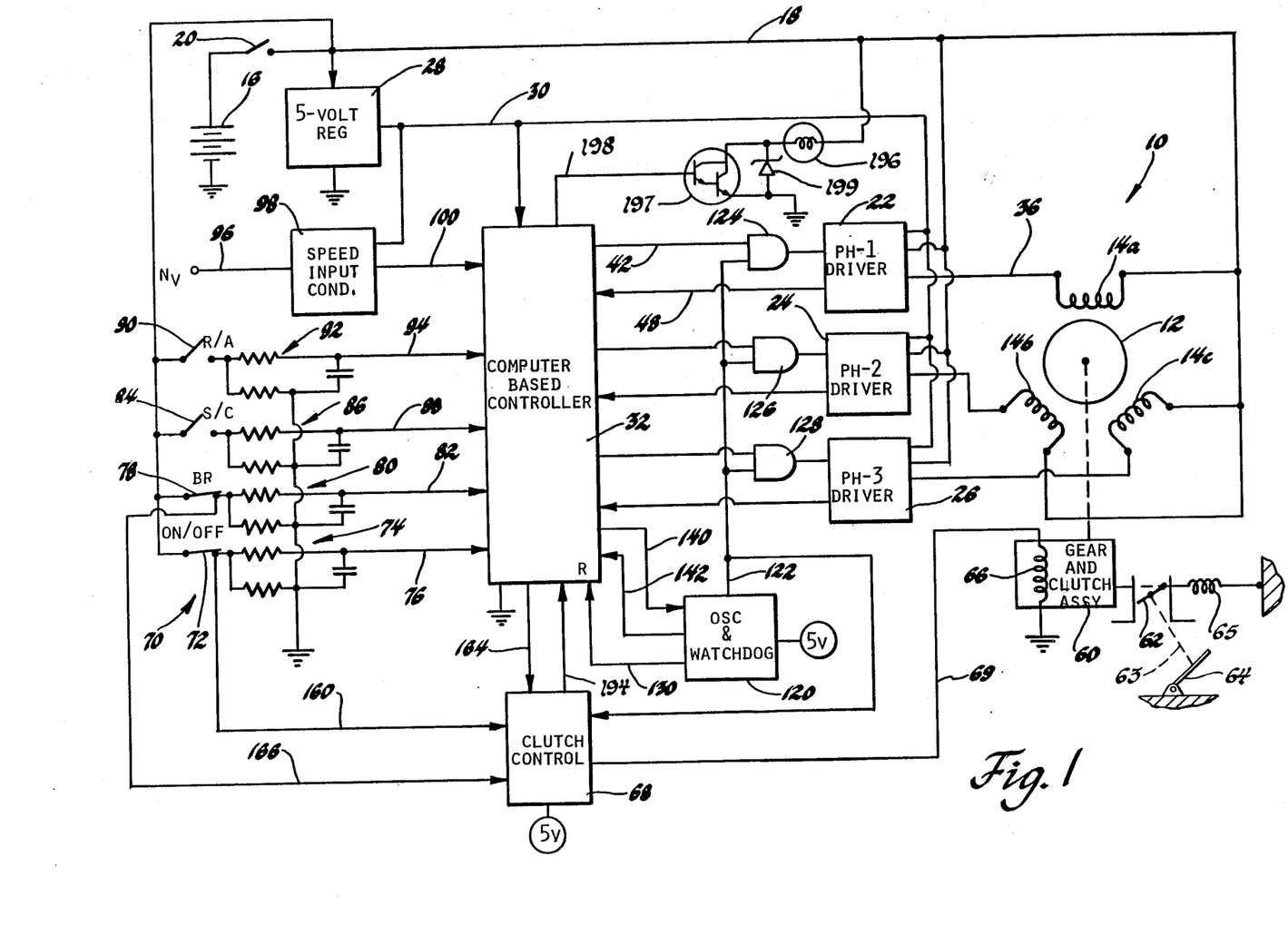
FIG. 1 is a block diagram of a motor driven cruise control system including a computer based controller for carrying out the control functions of this invention.

The reference numeral 10 generally designates an electric stepper motor having a permanent magnet rotor 12 and three-phase WYE-connected stator windings 14a-14c. One terminal of each winding 14a-14c is connected to the positive terminal of the vehicle storage battery 16 via line 18 and an ignition switch 20. The other terminal of winding 14a is connected to the phase driver 22; the other terminal of winding 14b is connected to the phase driver 24; and the other terminal of winding 14c is connected to the phase driver 26.

The phase drivers 22-26 and various other circuit blocks depicted in FIG. 1 are operated at a relatively low voltage (such as 5 volts) as provided by the voltage regulator 28 on the line 30. The connection of such voltage to certain of the circuit blocks is indicated by the circled 5V designation.

Phase drivers 22-26 each include a power switching device which is turned on and off by a computer based controller 32 to alternately energize and deenergize the respective phase windings 14a-14c in predetermined sequence for producing a rotating magnetic field in the stator of motor 10. The phase drivers 22-26 are essentially the same, the driver 22 being shown in greater detail in FIG. 3. As set forth therein, the phase driver 22 comprises a power FET 34 connected between the phase winding 14a and ground potential via line 36, a freewheeling diode 38 for circulating inductive energy stored in the winding 14a at turn-off and a zero crossing detector circuit 40. The power FET 34 is biased on and off by the controller 32 via line 42, which is connected to the gate of FET 34 through the AND gate 124.

Figure 3:
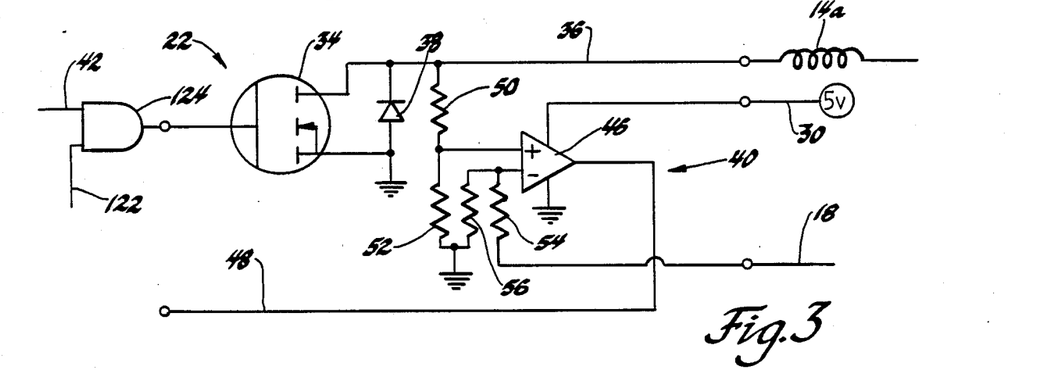

The zero crossing detector circuit 40 includes a comparator 46 which compares an offset of the phase winding voltage with a reference voltage, thereby to provide controller 32 with a zero crossing indication on line 48 for use in suitably commutating the stator windings 14a-14c. The winding voltage is applied to the noninverting input of comparator 46 through a voltage divider comprising the resistors 50 and 52. The reference voltage is defined by a voltage divider comprising the resistors 54 and 56.

The rotor 12 of stepper motor 10 is mechanically connected through a reduction gearset and clutch assembly 60 to an engine throttle 62. The throttle 62 is also mechanically connected via a suitable linkage 63 to a driver manipulated accelerator pedal 64. When the cruise control is active, the motor 10 controls the throttle position through the reduction gearset and clutch assembly 60; when the cruise control is inactive, the driver controls the throttle position through the linkage 63. A return spring 65 biases throttle 62 toward a closed position.

The clutch of reduction gearset and clutch assembly 60 is selectively activated by the solenoid coil 66 to make or break the mechanical connection between rotor 12 and throttle 62. The energization of solenoid coil 66 is controlled by the clutch control circuit 68 via line 69, the clutch control circuit being described in greater detail below in reference to FIG. 2. A reduction gearset and clutch assembly meeting the above description is set forth in detail in the Byram U.S. Pat. No. 4,643,038, issued Feb. 17, 1987, assigned to the assignee of the present invention, and incorporated herein by reference.

The reference numeral 70 generally designates a plurality of driver input circuits pertinent to vehicle speed control. Each such switch is connected between the downstream side of ignition switch 20 and the computer based controller 32. The ON/OFF switch 72 is connected to the controller 32 through RC network 74 and input line 76. Switch 72 is actuated by the driver to enable or disable the vehicle speed control function. The brake (BR) switch 78 is connected to the controller 32 through RC network 80 and input line 82. Switch 78 is normally closed, and is opened whenever the service brakes of the vehicle are operated. The ON/OFF and BR switches 72 and 78 also provide inputs to the clutch control circuit 68 via lines 160 and 166.

The set/coast (S/C) switch 84 is connected to the controller 32 through RC network 86 and input line 88. Switch 84 is normally open, and is closed momentarily or continuously by the driver to set a desired vehicle speed or to coast to a slower vehicle speed. The resume/accel (R/A) switch 90 is connected to the controller 32 through RC network 92 and input line 94. Switch 90 is normally open, and is closed momentarily or continuously by the driver to resume a previously set speed or to accelerate to a higher vehicle speed.

A vehicle speed signal $N_v$ on line 96 is applied to input conditioning circuit 98 which supplies a vehicle speed feedback signal to controller 32 via input line 100. As set forth in FIG. 5, the input conditioning circuit 98 includes a capacitor 102 which is charged by the 5-volt supply through the resistor 104 and discharged by the vehicle speed signal $N_v$ through resistor 106 and diode 108. The capacitor 110 is for transient suppression. The charge/discharge switching frequency provides an indication of the vehicle speed and is applied to the inverting input of operational amplifier 112. An offset voltage defined by the voltage divider resistors 114 and 116 is applied to the noninverting input of operational amplifier 112. As a result, the switching frequency of operational amplifier 112 on line 100 is representative of the vehicle speed $N_v$.

A watchdog circuit 120 cooperates with the controller 32 in a conventional manner to detect the occurrence of a controller malfunction. In the event of a malfunction, the watchdog circuit 120 operates to de-energize the phase windings 14a–14c via line 122 and AND gates 124–128, to disengage the clutch of gearset and clutch assembly 60 via line 122 and clutch control circuit 68, and to reset the controller 32 via line 130. As set forth in FIG. 4, watchdog circuit 120 comprises an RC oscillator 132 and a reset logic circuit 134. Oscillator 132 has an operating frequency of approximately 25 Hz, and its output on line 136 is applied as an input to exclusive NOR gate 138. The other input to the gate 138 is supplied by controller 32 on line 140. The output of gate 138 is applied as an input to controller 32 via line 142, and also as an input to exclusive NOR gate 144 through the RC network 146. The periodic voltage transitions on line 142 signal the controller 32 to drive the output line 140 to the same voltage level. Until the controller 32 responds, the output of exclusive NOR gate 138 falls to a logic zero voltage potential, allowing the capacitor 148 of RC network 146 to discharge.

Figure 4:
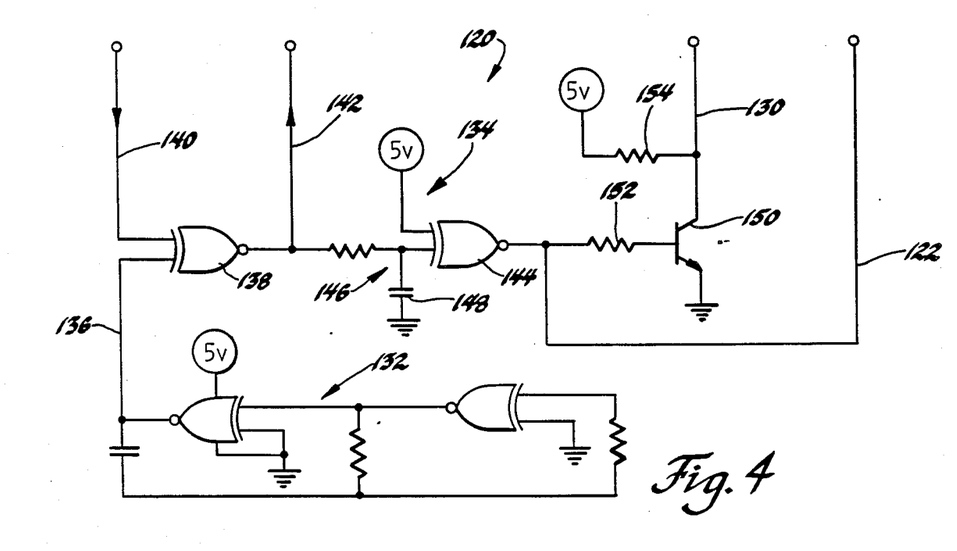
Figure 5:
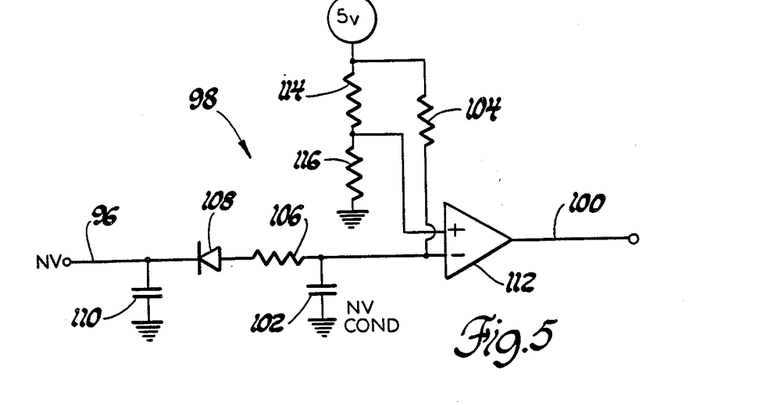

In normal operation, the controller 32 quickly responds to the voltage transitions on line 142 and the output of exclusive NOR gate 138 is returned to a logic one voltage potential. Since the output of gate 138 is low for only a short period of time, the capacitor 148 remains charged at a relatively high voltage level, and the output of exclusive NOR gate 144 is maintained at a logic one voltage potential. Transistor 150, which is connected to the output of gate 144 through resistor 152, is maintained conductive, holding the reset input (R) of controller 32 substantially at ground potential.

If a malfunction prevents controller 32 from properly responding to the voltage transistions on line 142, gate 138 remains at a logic zero voltage potential and capacitor 148 becomes substantially discharged. As a result, the output of gate 144 falls to a logic zero voltage potential. At such point, line 122 signals the AND gates 124–128 to de-energize windings 14a–14c, and the clutch control circuit 68 to disengage the clutch of gearset and clutch assembly 60. In addition, transistor 150 is biased nonconductive, and the resistor 154 raises line 130 to a relatively high voltage potential to effect a reset of the controller 32. The voltage transitions on line 142 continue to occur and when the controller 32 properly responds thereto, the watchdog circuit 120 operates as described in the previous paragraph.

Figure 2:
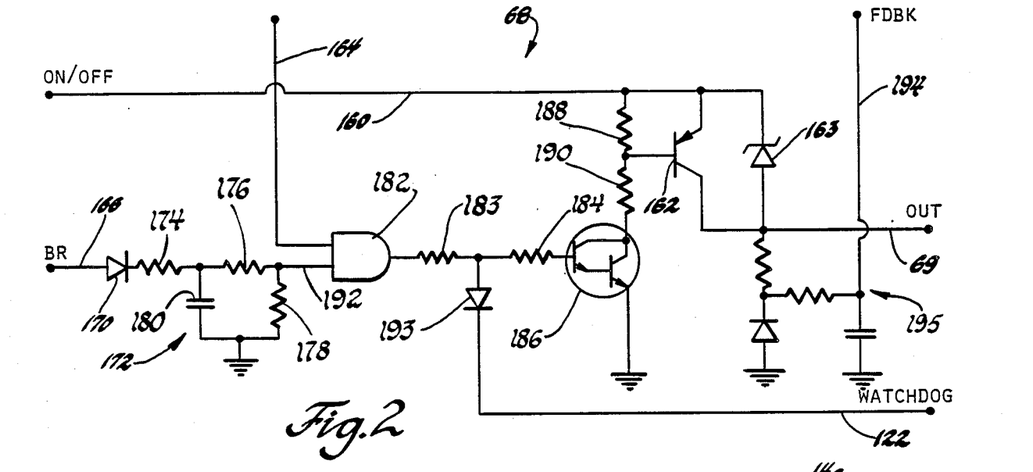
FIGS. 2-5 are circuit diagrams depicting certain of the functional blocks of FIG. 1 in more detail.

The clutch control circuit 68 depicted in FIG. 2 controls the energization of solenoid coil 66 via line 69. The energization current for coil 66 is supplied from the downstream side of ON/OFF switch 72 through line 160 and the emitter-collector circuit of transistor 162. As such, the motor 10 can only effect adjustment of throttle 62 when the ON/OFF switch 72 is closed. Whenever the switch 72 is moved to the OFF position (opened) the solenoid coil 66 is de-energized and the throttle 62 returns to a position dependent upon the position of accelerator pedal 64. A Zener diode 163 protects the transistor 162 when the coil 66 is deenergized.

Whenever the ON/OFF switch 72 is closed, the energization of coil 66 is controlled in accordance with a clutch command signal provided by the controller 32 on line 164 and a brake switch signal on line 166. The brake switch signal is obtained from the downstream side of brake switch 78, which is closed when the service brakes are not in use and open when the service brakes are being applied. The clutch command signal on line 164 is applied directly as an input to the AND gate 182. The brake signal on line 166 is applied as an input to AND gate 182 through the diode 170 and an RC network 172 comprising the resistors 174–178 and the capacitor 180. The output of AND gate 182 is applied through the resistors 183 and 184 to the base terminal of Darlington transistor 186 for controlling its conduction. The output circuit of Darlington transistor 186 is connected to the base terminal of transistor 162 through a divider comprising the resistors 188 and 190.

If the ON/OFF switch 72 is closed and the vehicle service brakes are not applied, the capacitor 180 is charged through diode 170 and resistor 174. In such state, the output of AND gate 182, and hence the conduction of transistors 186 and 162, is controlled in accordance with the clutch command signal on line 164. When the clutch command signal is high, the output of AND gate 182 is high and the transistors 186 and 162 are biased conductive to energize the coil 66 for engaging the clutch. When the clutch command signal is low, the output of AND gate 182 is low, biasing the transistors 186 and 162 nonconductive for de-energizing the clutch solenoid 66.

When the vehicle service brakes are applied, however, the brake switch 78 opens and capacitor 180 begins discharging through the resistors 176 and 178. Concurrently, the brake actuation is sensed by the controller 32, which energizes the motor 10 so as to drive the throttle 62 toward its closed (rest) position. When the service brakes are released, the brake switch closes once again to recharge the capacitor 180.

Figure 6:
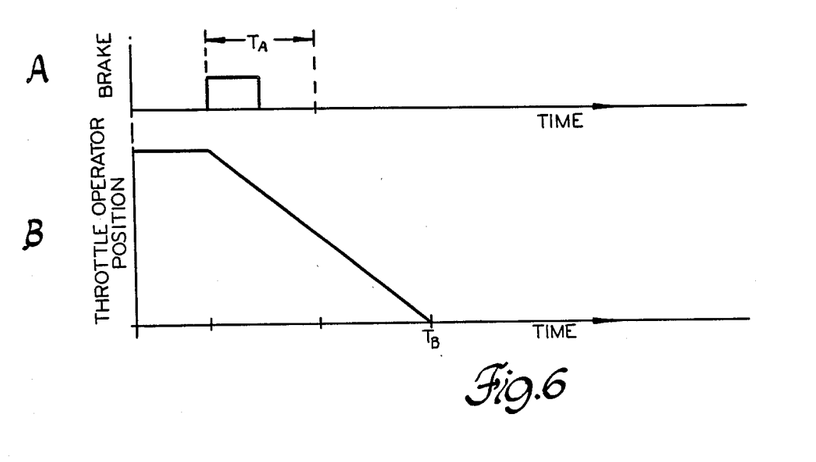
FIG. 6 depicts the release for a brief actuation of the brakes and FIG. 7 depicts the release for a prolonged actuation of the brakes.

In the event of a relatively brief actuation of the service brakes, as would occur during an unintentional or aborted braking maneuver, the voltage at the input 192 of AND gate 182 never falls to a logic zero voltage potential. In such case, the output of AND gate 182 remains high to maintain energization of the clutch solenoid 66, and the controller 32 continues its progressive return of the throttle 62 to its closed position. When the throttle 62 reaches its closed position, the clutch command signal on line 164 changes state. This toggles the AND gate 182 to its low state, biasing the transistors 186 and 162 nonconductive to disengage the clutch. This situation is graphically illustrated in FIG. 6, where graph A depicts a service brake actuation of less than interval $T_A$, and graph B depicts the progressive return of the engine throttle 62 to its closed (rest) position at time $T_B$.

Figure 7:
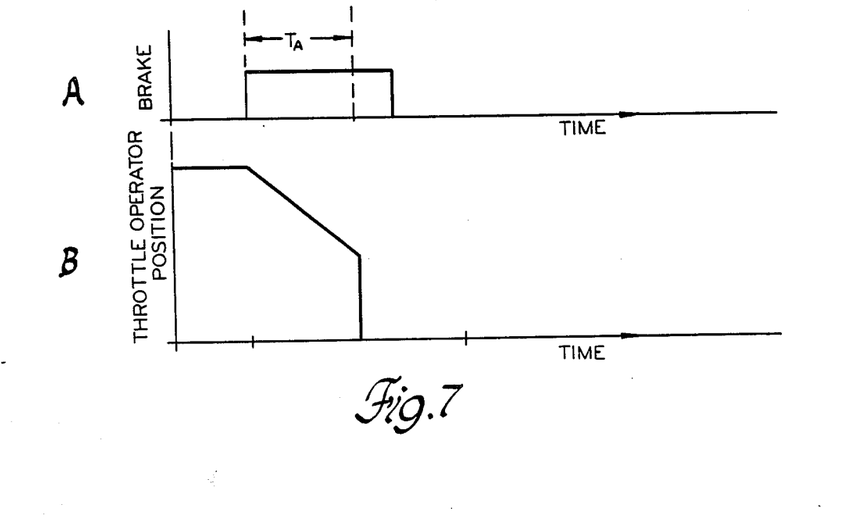

In the event of prolonged actuation of the service brakes, the capacitor 180 discharges and the voltage at the input 192 of AND gate 182 falls to a logic zero voltage potential. In such case, the output of AND gate 182 becomes low to interrupt energization of the clutch solenoid 66, overriding the progressive release initiated by the controller 32. This situation is graphically illustrated in FIG. 7, where graph A depicts a service brake actuation in excess of the interval $T_A$, and graph B depicts the immediate return of the throttle 62 to its closed (rest) position through disengagement of the clutch at the expiration of the interval $T_A$.

A similar override of the clutch command signal on line 164 is effected by the watchdog circuit 120 in the event of a controller malfunction. The line 122 is connected to the junction of resistors 183 and 184 through the diode 193, and serves to independently bias the transistors 186 and 162 nonconductive to de-energize the clutch coil 66.

A feedback signal indicative of the state of clutch control circuit 68 is provided to controller 32 on line 194. The feedback signal is generated by a diode and RC network 195, which provides a filtered indication of the voltage on coil energization line 69.

In addition to controlling the energization of windings 14a–14c and the solenoid coil 66, the controller 32 operates a driver indicator lamp 196. Essentially, the lamp 196 is lit whenever the vehicle speed control function is active. The lamp is connected between the battery supply line 18 and ground potential via the Darlington transistor 197, and controller 32 controls the conduction of transistor 197 via line 198. The Zener diode 199 protects transistor 197 from damage due to voltage transients.

Figures 8, 9:
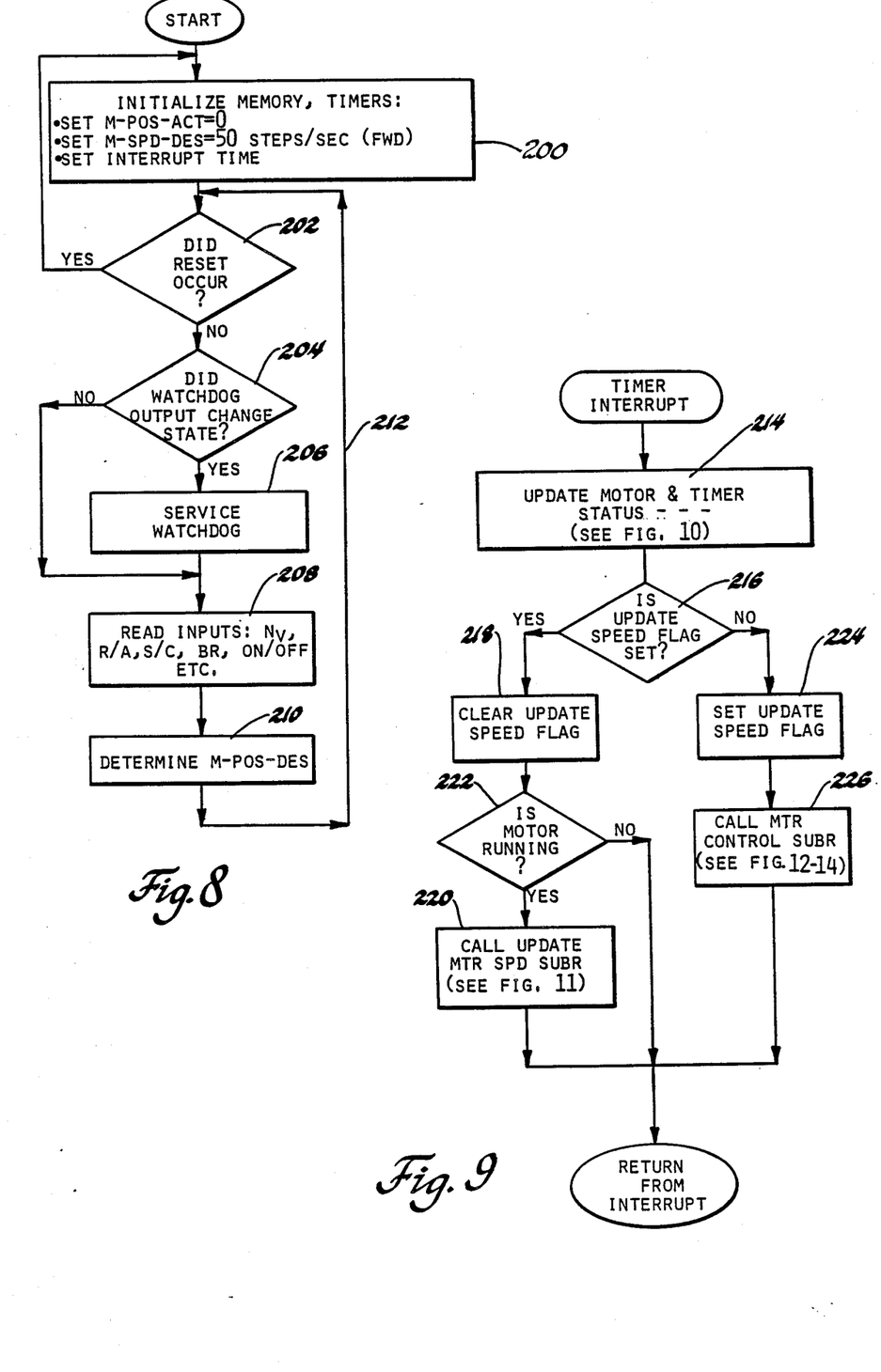
FIGS. 8-14 set forth flow diagrams representative of computer program instructions executed by the computer based controller of FIG. 1 in carrying out the cruise control and the control functions of this invention.
Figure 10:
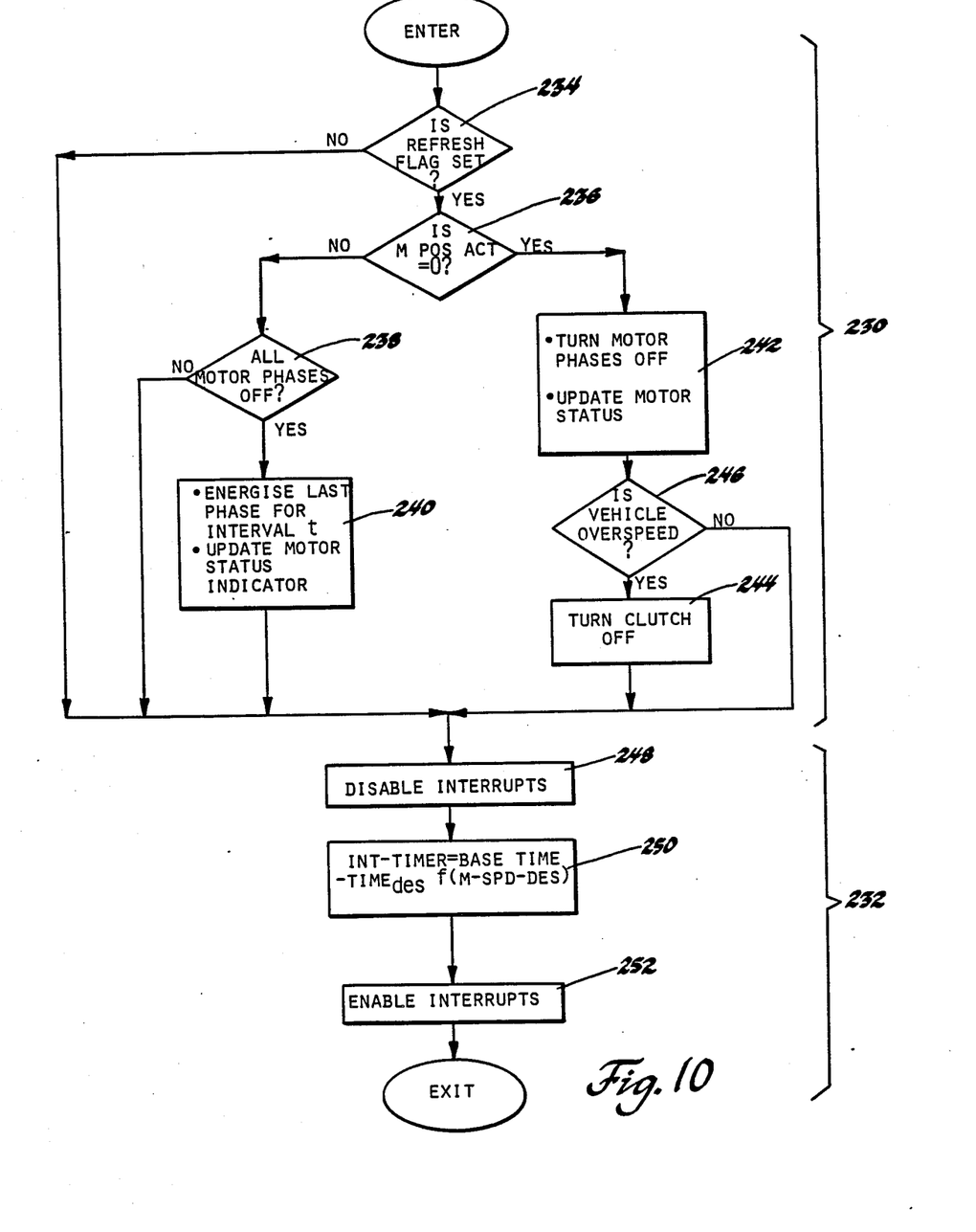
Figure 11:
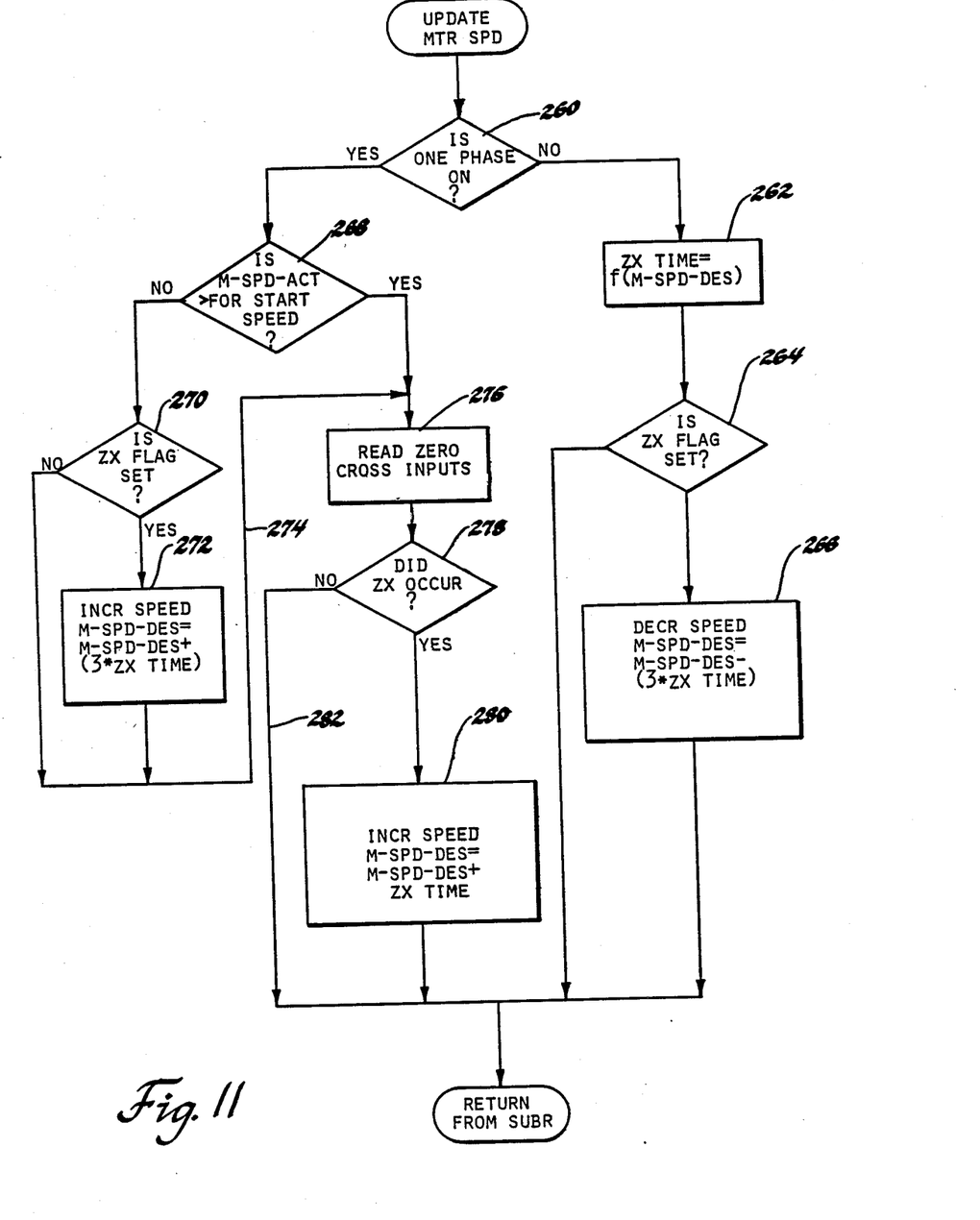

The flow diagrams of FIGS. 8–14 represent computer program instructions executed by the computer based controller 32 in carrying out the cruise control and the progressive brake initiated release function of this invention. The flow diagram of FIG. 8 represents a main or background program loop which reads the system inputs, services the watchdog circuit 120 and determines the desired motor position. The remaining flow diagrams pertain to an interrupt service routine and various subroutines called thereby in response to a timer generated interrupt to update the motor status and to adjust the desired motor speed, if necessary. A detailed description of the various routines is set forth in the above-referenced patent to Nehmer et al., and is not repeated in its entirety here.

Figure 12:
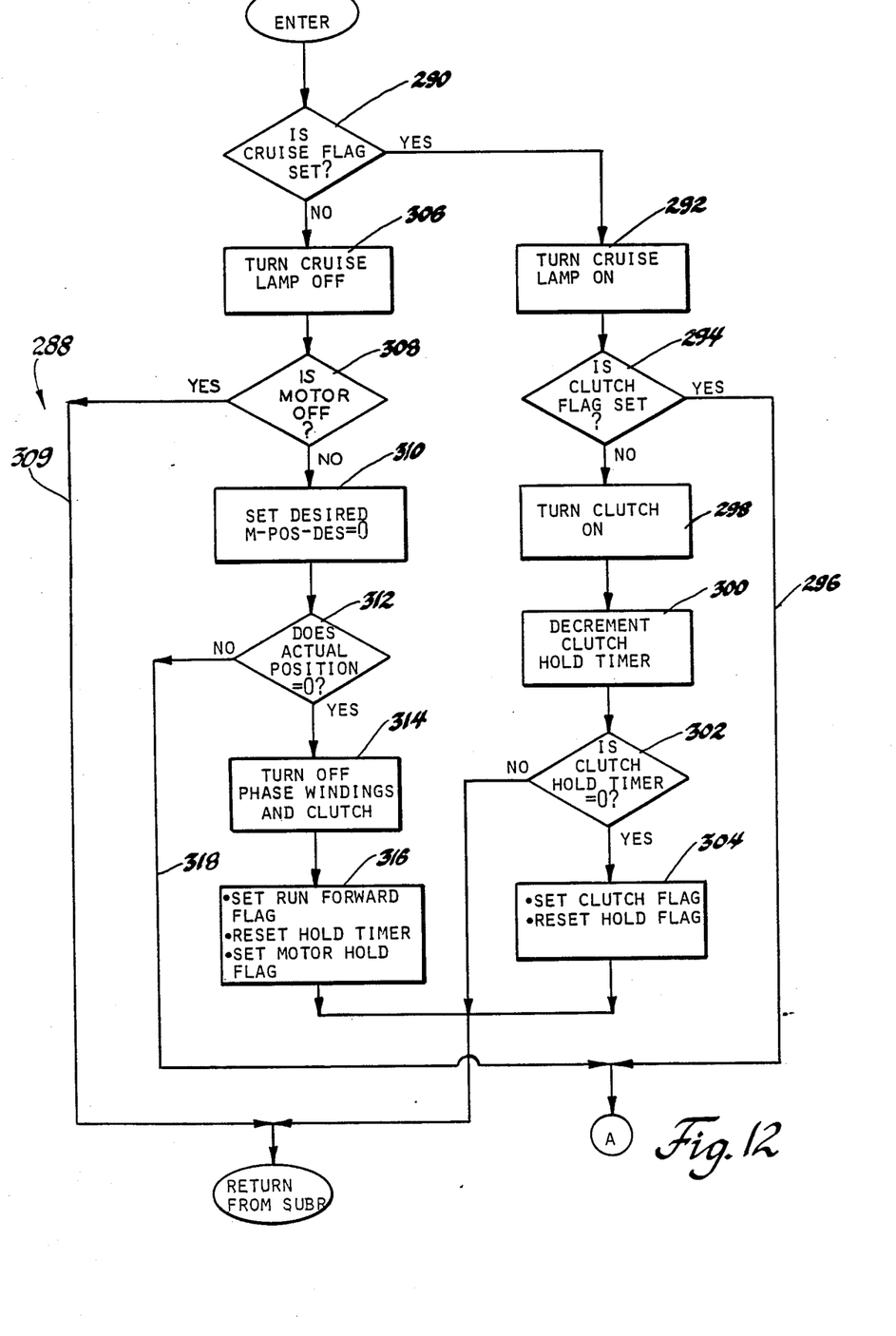

The progressive brake-initiated release of the throttle 62 to its closed (rest) position is carried out by the MTR CONTROL subroutine flow diagram portion 288 of FIG. 12. Referring to FIG. 12, the decision block 290 first determines if the CRUISE flag is set. The state of the CRUISE flag is controlled by the background program of FIG. 8 in accordance with states of the input switches 72, 78, 84 and 90 to indicate whether the cruise control is active. If the cruise control is active—that is, both ON/OFF and BR switches 72 and 78 closed—the CRUISE flag is set. If the cruise control is inactive—that is, ON/OFF or BR switches 72 and 78 open—the CRUISE flag is cleared.

If decision block 290 is answered in the affirmative, the blocks 292–304 are executed to light the indicator lamp 190 and to initiate motor control if the clutch has been engaged for at least a hold period. If decision block 290 is answered in the negative, the instruction block 306 is executed to extinguish the indicator lamp 196 and the brake-initiated release logic of flow diagram portion 288 is executed to progressively release the cruise control if required.

Figure 13:
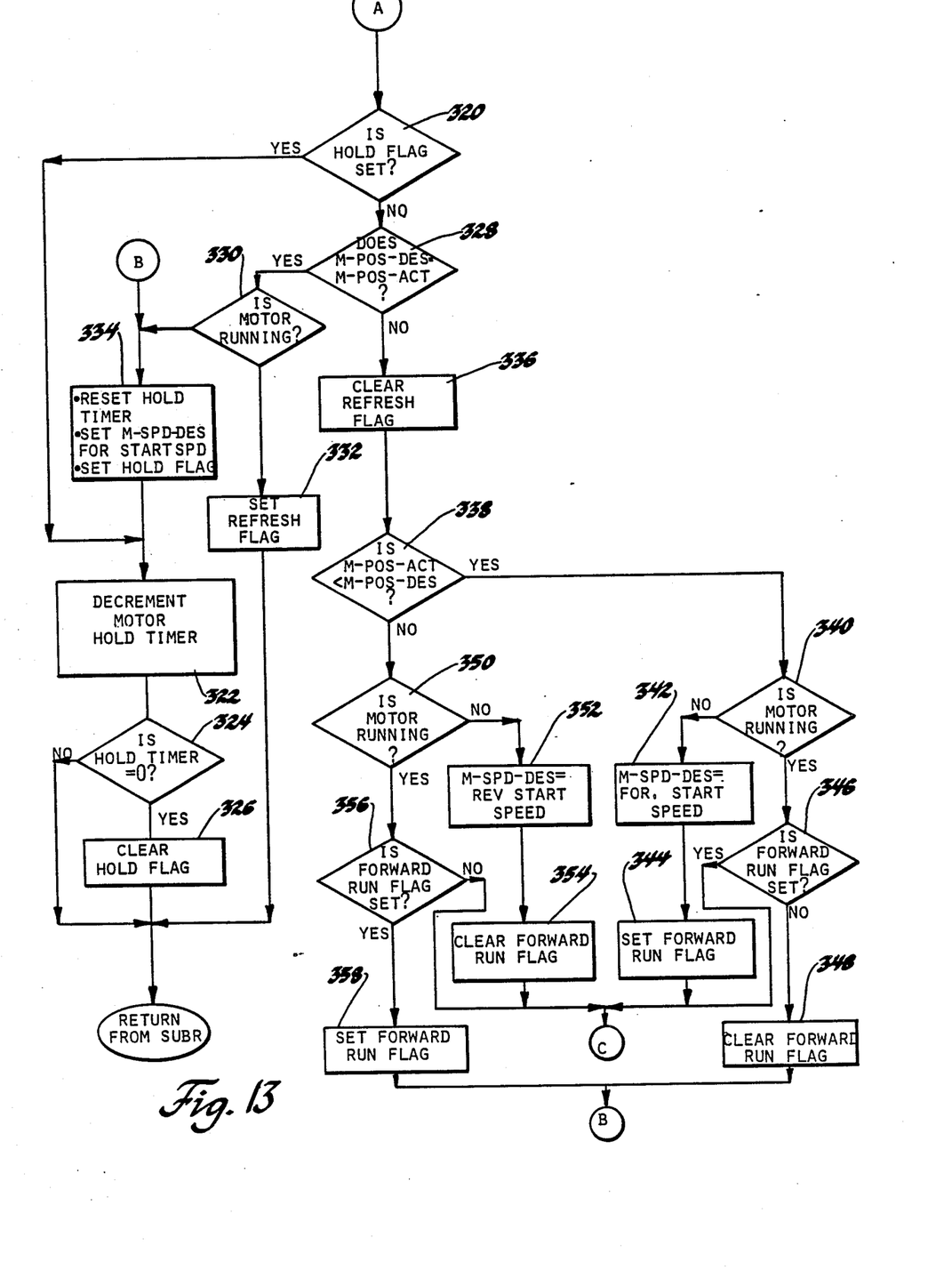
Figure 14:
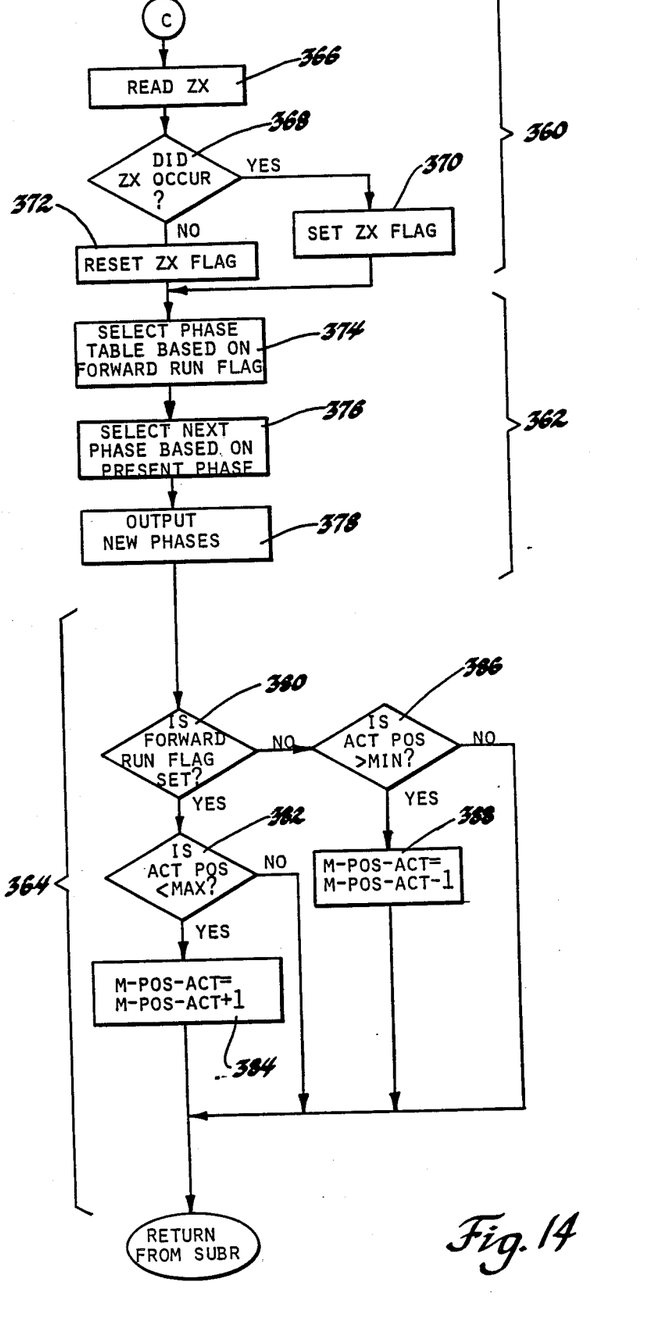

Referring now to the flow diagram portion 288, the decision block 308 is first executed to determine if the motor 10 is off. If so, the remainder of the routine is skipped as indicated in the flow diagram line 309. If the motor is not off, the blocks 310–316 are executed to disengage the clutch after energizing the motor 10 to progressively return the throttle 62 to its closed position. The instruction block 310 sets the desired motor position M-POS-DES to zero. The decision block 312 determines if the motor has actually returned to the "zero throttle" position. If so, the instruction blocks 314–316 are executed to turn off the phase windings 14a–14c and the clutch solenoid coil 66 and to set various flags and timers in preparation for the next motor operation. If the motor 10 has not yet attained the "zero throttle" position, the motor control logic of FIG. 13 is executed as indicated by the flow diagram line 318.

In the manner described above, the engine throttle 62 is progressively returned to its closed (rest) position in response to actuation of the vehicle brakes so as to eliminate or at least reduce pedal slap noise. The progressive release is initiated by the electric motor drive, which may be overridden by the clutch control circuit 68 if the duration of the braking exceeds the reference interval defined by the RC network 172.

While this invention has been described in reference to the illustrated embodiment, it will be understood that it is not limited thereto, that various modifications will occur to those skilled in the art, and that systems incorporating such modifications may fall within the scope of this invention, which is defined by the appended claims.

The embodiments of the invention in which an exclusive property or privilege is claimed are defined as follows:

1. A motor vehicle engine throttle control having a driver manipulated accelerator pedal mechanically coupled to the engine throttle, and a cruise control system including an electric motor mechanically coupled to said throttle through a selectively engageable clutch mechanism, apparatus for releasing the cruise control system upon actuation of a vehicle service brake so as to reduce coupling and pedal noise caused by sudden disengagement of the clutching mechanism, the apparatus comprising:

first means effective in response to actuation of the service brake for energizing the electric motor in a manner to progressively return the engine throttle to a rest position while maintaining engagement of the clutch mechanism until said rest position has been substantially achieved; and second means effective in response to actuation of the service brake beyond a predetermined interval indicative of potentially significant braking effort to disengage the clutch mechanism, thereby overriding the progressive return initiated by the first means.

2. A motor vehicle engine throttle control having a driver manipulated accelerator pedal mechanically coupled to the engine throttle, and a cruise control system including an electric motor mechanically coupled to said throttle through a selectively engageable clutch mechanism, apparatus for releasing the cruise control system upon actuation of a vehicle service brake, the apparatus comprising:

first control means effective in response to actuation of the service brake for (1) energizing the electric motor in a manner to progressively return the engine throttle to a rest position, and (2) generating a clutch command for maintaining engagement of the clutch mechanism until said rest position has been substantially achieved; and second control means effective to control engagement of said clutch mechanism in accordance with the clutch command generated by said first means, and further effective in response to actuation of the service brake beyond a predetermined interval indicative of potentially significant braking effort to independently disengage the clutch mechanism, thereby overriding the progressive return initiated by the first means.

3. The apparatus set forth in claim 2, wherein the second control means includes:

brake responsive means for generating an override control signal if the service brake has been actuated beyond said predetermined interval; and clutch mechanism control means responsive to said clutch command and said override control signal, and effective (1) in an absence of said override control signal to selectively engage the clutch mechanism in accordance with said clutch command, and (2) in the presence of said override signal to disengage the clutch mechanism without regard to said clutch command.

4. In motor vehicle engine throttle control having a driver manipulated accelerator pedal mechanically coupled to the engine throttle, and a cruise control system including an electric motor mechanically coupled to said throttle through a selectively engageable clutch mechanism, a method of operation for releasing the cruise control system upon actuation of a vehicle service brake, such method comprising the steps of:

energizing the electric motor in response to actuation of the service brake in a manner to progressively return the engine throttle to a rest position while maintaining engagement of the clutch mechanism until said rest position has been substantially achieved; and disengaging the clutch mechanism in response to actuation of the service brake beyond a predetermined interval indicative of potentially significant braking effort, thereby overriding the progressive return initiated at the actuation of the service brake.

* * * * *